United States Patent [19]
McConkey

[11] Patent Number: 5,494,134
[45] Date of Patent: *Feb. 27, 1996

[54] HIGH PRESSURE COOLANT SYSTEM FOR MACHINE TOOLS

[76] Inventor: James W. McConkey, 5231 Co Rd 5-2, Delta, Ohio 43515

[*] Notice: The term of this patent shall not extend beyond the expiration date of Pat. No. 5,297,657.

[21] Appl. No.: 138,264

[22] Filed: Oct. 20, 1993

Related U.S. Application Data

[63] Continuation of Ser. No. 736,027, Jul. 25, 1991, Pat. No. 5,297,657.

[51] Int. Cl.$^6$ ............................................. B23B 51/06
[52] U.S. Cl. ..................... 184/614; 184/624; 184/27.1; 407/11; 408/61; 409/137
[58] Field of Search ................................ 184/6.14, 6.24, 184/27.1; 407/11; 408/61; 409/137

[56] References Cited

U.S. PATENT DOCUMENTS

| | | | |
|---|---|---|---|
| 989,002 | 4/1911 | Hanson | 408/61 |
| 2,039,002 | 7/1935 | Hutchison | 180/54.1 |
| 2,653,517 | 5/1951 | Pigott | 409/132 |
| 3,547,350 | 12/1970 | Marcoux | 239/308 |
| 4,529,340 | 7/1985 | O'Dell | 408/1 R |

*Primary Examiner*—John Rivell
*Assistant Examiner*—Christopher Atkinson
*Attorney, Agent, or Firm*—Harness, Dickey & Pierce

[57] ABSTRACT

A coolant system is disclosed for use with a machine tool in which coolant is used to both cool and lubricate a workpiece and cutting tool. The system of the present invention utilizes a positive displacement pump with one or more spray nozzles each having a restricted orifice whereby the coolant is sprayed from the nozzles at a relatively high velocity and pressure enabling the coolant to be precisely directed to the cutting location to provide optimum cooling and lubricating of the workpiece and cutting tool. Check valves are provided for both the pump inlet and outlet lines to maintain the pump in a primed condition and prevent drainage of coolant from the coolant system when the pump is not operating. The system filter is mounted to a flexible coolant line to enable the filter to be raised from the coolant reservoir and the filter is coupled to the coolant line by a quick connect/disconnect coupler to enable the filter to be raised from the reservoir and quickly replaced with a clean filter when the first filter becomes clogged and requires cleaning.

8 Claims, 3 Drawing Sheets

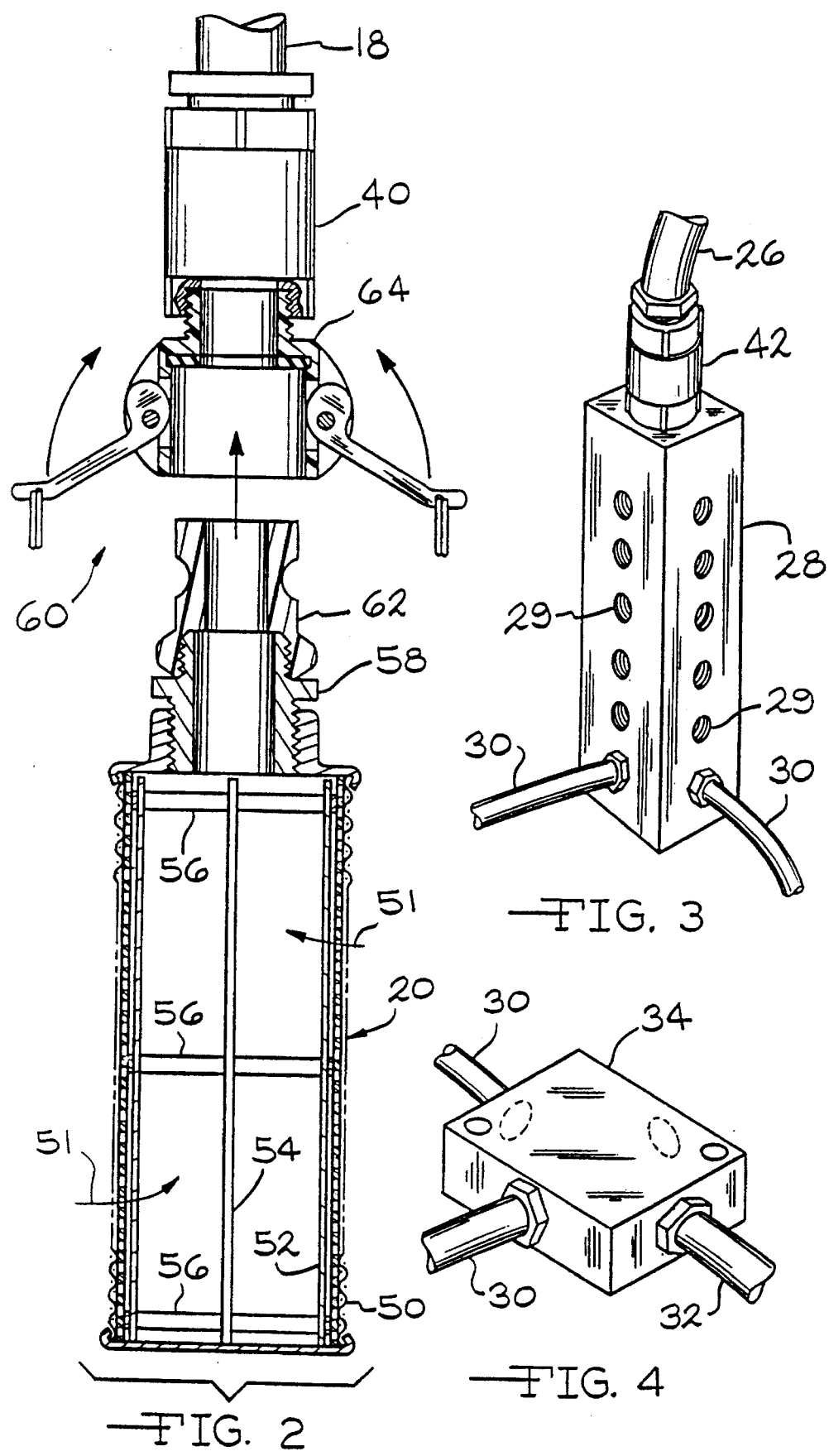

HIGH PRESSURE COOLANT SYSTEM FOR MACHINE TOOLS

This application is a continuation of application Ser. No. 07/736,027, filed Jul. 25, 1991, now U.S. Pat. No. 5,297,657.

BACKGROUND AND SUMMARY OF THE INVENTION

The present invention relates to a cooling system and in particular to a cooling system used in an application in which a high coolant pressure and high delivery velocity is desired. One such application is in the machine tools where a cutting fluid is provided to cool and lubricate the tool and workpiece and to wash away cut chips.

Typical machine tool coolant systems produce a coolant pressure estimated at between 15 and 30 psi at the pump outlet which is delivered to the tooling and workpiece with a relatively large diameter outlet. The coolant is delivered to the cutting site through outlets varying in diameter from one quarter to one inch and possibly more. The number of coolant lines used varies depending upon the number and nature of machining operations. With typical cooling systems, the coolant impacts the tooling and workpiece with relatively little velocity and at low pressure to flood the workpiece. During some machine operations such as drilling or boring, the accessibility to the cutting location is extremely limited. With flooding type coolant delivery, the low velocity and low pressure coolant may not reach the cutting surface. The result is that cutting is typically performed dry or with inadequate cooling and lubricating. This produces high cutting temperatures and wear resulting in short tool life, necessitating frequent tooling changes and consequent machine down time. In addition, the flood coolant flow may not be adequate to remove the metal chips at the point of cutting. The chips may interfere with the cutting operation producing a surface finish of lower quality than desired.

In an effort to improve the delivery of coolant with certain tools, e.g. drills, tools have been developed with a coolant passages extending through the tool itself to deliver coolant to the cutting surface. This however, adds significantly to the cost of the tool and machine. Furthermore, due to the relatively low fluid pressures utilized, insufficient pressure is often provided to remove chips from the coolant passage such that coolant flow is blocked.

It is known that high temperature and lack of lubrication are the primary causes of tool wear. If cooling and lubrication can be increased, tool life will be extended, reducing the manufacturing cost. Cost is reduced by fewer tools needed to produce a given quantity of parts, less machine down time for tool changes and less operator time required to change tools.

Accordingly, it is an objective of the present invention to improve the cooling system of a machine tool to reduce tool and workpiece temperatures and to improve lubrication.

It is a feature of the present invention to use small coolant spray streams from spray nozzles and to direct the spray streams precisely to the cutting locating rather than to flood the workpiece and tool with coolant.

It is another feature of the present invention to provide high pressure and high velocity coolant flow to force the coolant to hard to reach cutting locations to improve cooling and lubrication.

By providing increased pressure and velocity to the coolant flow, the coolant is forced into locations not reached with low pressure flooding cooling systems. This provides numerous advantages such as improved removal of the cut chips from the cutting location, the temperature of both the workpiece and the tooling is reduced and tooling wear is reduced. These advantages can be manifested in many ways such as: elimination of the need for coated tooling in many applications; elimination of through-the-tool coolant passages; longer tool life before grinding and less material removal during grinding; decreased machine cycle time resulting from faster machining; reduced number of tools from the tooling set up; less operator time per machine allowing one person to operate more machines; and improved surface finish reducing the need for grinding. The advantages derived from improved cooling can be applied in many ways depending on what factors are to be maximized.

The cooling system of the present invention also improves the coolant filter set up. A disadvantage with many currently used cooling systems pertains to the filter used to remove chips from the coolant. The filters are frequently permanently installed in the coolant reservoir, necessitating that the machine operator reach into the reservoir to remove accumulated chips from the filter. For many machine operators, excessive skin contact with the coolant can cause dermatitis. Further, because the coolant is often hot, it can produce burns. If a thorough cleaning of the filter is required, the operator must remove the filter from the coolant reservoir, necessitating machine down time of as much as five to thirty minutes.

Accordingly, it is a further objective of the present invention to provide a coolant system having a filter that minimizes operator contact with the coolant for filter cleaning and that reduces machine down time required for filter cleaning.

The advantage of minimizing operating contact with the coolant is a safer environment for the operator. By reducing machine down time for filter cleaning, productivity can be increased.

The cooling system of the present invention accomplishes these objectives by utilizing a positive displacement pump together with small orifice nozzles at the coolant discharge. This provides for a high velocity coolant discharge and creation of high pump outlet pressure while maintaining a large coolant flow rate.

The coolant filter on the intake side of the pump is mounted by a flexible hose enabling the filter to be readily removed from the coolant reservoir for cleaning, thereby eliminating the need for the machine operator to reach into the coolant reservoir. Furthermore, the filter is coupled to the inlet hose with a quick connect/disconnect coupling. By utilizing two filters per machine, an operator can quickly remove a dirty filter and install a clean filter, returning the machine to operation in a minimal length of time. After filter change, the dirty filter is cleaned while the machine is operating and is available for use when the next filter cleaning is required.

Further objects, features and advantages of the invention will become apparent from a consideration of the following description and the appended claims when taken in connection with the accompanying drawings.

BRIEF DESCRIPTION OF THE DRAWINGS

FIG. 2 is a sectional view of the filter and quick connect/disconnect coupling used to change filters;

FIGS. 3 and 4 are enlarged perspective views of the manifold distribution blocks of the present system;

DETAILED DESCRIPTION OF THE INVENTION

Figure 1:
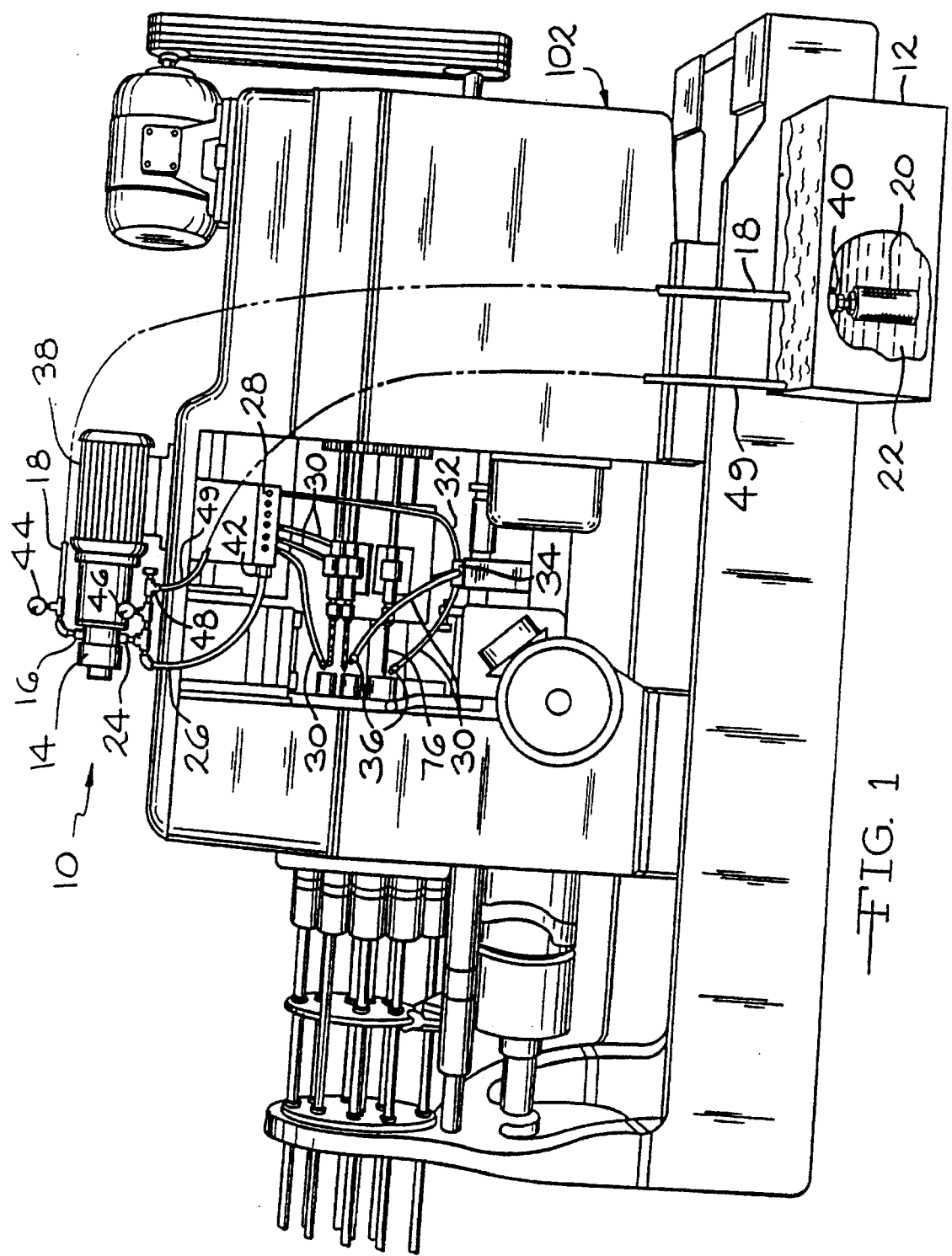
FIG. 1 is a side elevational view of a machine tool equipped with the high pressure coolant system of the present invention.

The high pressure coolant system of the present invention is designated generally at 10 in FIG. 1 and is shown installed on a machine tool 102. Machine tool 102 is generally in the form of a multiple spindle screw machine that is shown only by way of example. It is to be understood that the coolant system 10 can be installed to any type of machine tool where material removal is being performed. Coolant system 10 is used to provide a flow of coolant, either water or oil based, to the location of the cutting operation for lubricating and cooling the workpiece and tool. After use, the coolant drains to a reservoir 12 in the base of the machine from which it is drawn by the system 10 for reuse. Reservoir 12 is shown in front of machine 102 only for illustration purposes.

Figure 6:
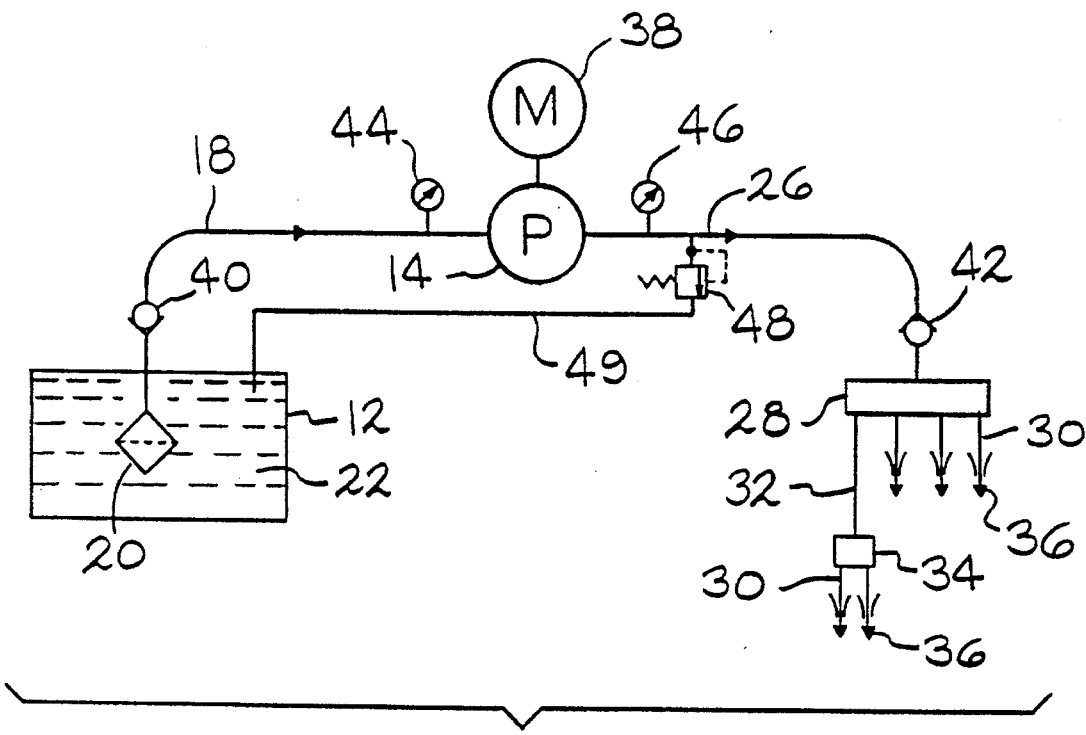
FIG. 6 is a schematic view of the high pressure coolant system of the present invention.

The cooling system 10, which is also shown schematically in FIG. 6, includes a pump 14 used to pump the coolant from the reservoir 12 to the cutting location. Pump 14 is driven by electric motor 38. The pump inlet 16 is in fluid communication with the coolant reservoir through an inlet hose 18. A filter 20 is coupled to the end of hose 18 and immersed in the coolant 22 in the reservoir. During the machining operation, numerous cut metal chips accumulate in the coolant, necessitating the use of the filter to prevent recirculating of the metal chips. Periodically the accumulated metal chips are removed from the reservoir 12.

From the pump outlet 24 the coolant is directed through an outlet hose 26 to a distribution manifold 28. The inlet and outlet hoses 18, 26 can be either rigid or flexible except as noted below. From manifold 28, the coolant is directed through a plurality of spray tubes 30 or through a secondary hose 32 to a secondary manifold 34. From secondary manifold 34 the coolant flows through additional spray tubes 30. The use of a secondary manifold is optional and depends upon the application, number and location of spray nozzles. Various size pumps can be used with various size motors to produce coolant flow rates from between 3.5 to 40 gallons per minute. The end of each spray tube 30 is equipped with a nozzle 36. Various nozzles can be used having outlet orifices ranging in size from 0.020 inches up to 0.100 inches. The coolant is sprayed through the nozzles 36 against the workpiece and tool at the point of cutting to both wash away cut chips and to cool the workpiece and tool. Different nozzles can be employed with various spray angles ranging from 0° to 40°. The spray angle is determined by the cut being made to ensure complete coverage over the entire cutting area.

The small size of the coolant spray streams enables the coolant to be precisely delivered to the location where cooling is needed, i.e. where the heat is generated by cutting. This is in contrast to flood cooling where a large portion of coolant never reaches the location of heat generation.

The system 10 contains two check valves to prevent coolant draining from the system when the system has been shut down. The inlet check valve 40 is positioned at the filter end of the inlet hose 18 and prevents coolant in the inlet hose from draining back into the reservoir 12 when the pump is shut down. The check valve 40 is overcome by the suction from pump 14 to open the check valve enabling coolant to be drawn into the pump. The outlet check valve 42 is a pressure actuated valve and is disposed at the manifold end of outlet hose 26 to prevent the coolant from draining from the outlet hose 26 through the manifold and spray tubes 30 when the system has been shut down. Valve 42 is only opened when the pump outlet pressure reaches a minimum value while the inlet valve 40 is only opened when the pump suction pressure reaches minimum value.

By maintaining coolant in both the inlet and discharge hoses 18, 26, when the pump is restarted, coolant spray begins almost immediately. There is no delay necessary for the pump to draw coolant from the reservoir and pump it to the nozzles before coolant spray begins. In addition, the presence of coolant in the inlet hose reduces the impact on the inlet hose and filter of the initial suction when the pump is started. The inlet hose 18 is reinforced, such as by steel belting or an internal wire coil, to prevent collapse from the pump suction.

A vacuum gauge 44 connected to the inlet line 18 enables the machine operator to monitor the vacuum produced by the pump. Likewise, a pressure gauge 46 connected to the outlet hose 26 enables the machine operator to monitor the coolant pressure produced by the pump.

A relief valve 48 is coupled to the outlet hose 26 to relieve pressure in the event that the coolant pressure in the outlet hose 26 exceeds a predetermined safe operating value. Line 49 returns the coolant from the relief valve to reservoir 12. System pressure can exceed normal values for several reasons with the primary reason being a plugged spray nozzle.

Various pumps were tried in the development of the cooling system including gear pumps and centrifugal pumps. Pump 14 is a positive displacement pump that produces a relatively constant output flow rate for a given pump speed over a large range of pump outlet pressures. The only pump found to date with satisfactory performance is an internal gear pump such as a Gerotor pump from Double A Products Co, Troy, Mich. (Gerotor is a registered trademark of Double A Products Co.) Only the internal gear pump was able to maintain the desired flow rate and pressures. One advantage of the internal gear pumps versus other positive displacement pumps is their tolerance of contaminants in the coolant. While filtration is still important, it is not as critical as with other positive displacement pumps. Various size pumps can be used with various size motors to produce coolant flow rates from between 3.5 to 40 gallons per minute. Preferably, the flow rate used is increased compared to the flow rate with the currently used flood coolant delivery. With the higher flow rate, should the filter become partially plugged, there will still be sufficient flow to provide adequate cooling. The needed coolant flow rate also varies from one application to the next with some development necessary to determine the optimum flow rate.

For a given pump and motor, the pressure developed can be controlled by varying the size of the nozzle orifices and the number of orifices. If desired, the pressure can be controlled by an adjustable pressure regulator.

Depending upon the pump and motor size, pressure can range from 300 to 2000 psi. The actual pressure needed will vary from one machine operation to the next. Some development may be necessary for each application to arrive at the optimum pressure. Proper chip removal is an important factor in determining proper pressure. There should be enough pressure to remove chips but not so much pressure as to prevent chips from flowing out of a bore hole, etc. Other factors include the depth of the part being drilled, the amount of material being removed and the type of material being machined.

The invention is not limited to an internal gear pump, other pumps capable of producing the desired pressure and flow rate can be used as well. The internal gear pump can develop sufficient inlet suction to enable the pump to be placed several feet above the coolant reservoir as shown in FIG. 1 if desired.

The nozzles 36 at the end of spray hoses 30, by having a small outlet orifice size, 0.020–0.100 inches, provide a relatively small cross-sectional area for the coolant flow compared to the 0.25–1.0 inch diameter outlets used with coolant flooding. As a result, the velocity of the coolant flow through the orifices must be significantly increased in order to maintain the given flow rate. The reduced diameter orifices increases the static fluid pressure within the outlet hose 26 and increases the dynamic pressure in the spray discharged from the nozzles 36. The small size of the spray stream, its increased velocity and increases pressure, enables the machine operator to better and more accurately direct the coolant spray to the cutting location. This enhances lubrication and cooling of the workpiece and removal of metal chips.

Developmental testing has shown that best pump performance is achieved when the pump inlet diameter is at least approximately one and one half times the size of the pump outlet diameter. If the pump used has a smaller inlet to outlet diameter ratio, a fitting can be installed in the pump outlet to reduce the outlet to the required size.

With many machining operations, such as drilling, it is very difficult to direct the coolant to the tip of the cutting tool where metal cutting is taking place. As a result, in many instances the cutting may actually be taking place on dry metal without coolant present. This produces extremely high workpiece and machine tool temperatures. This increases the wear of the tool, necessitating the need for regrinding to sharpen the tool and frequent tool replacement. The high pressure spray available with the coolant system of the present invention enables the coolant to be directed into the bore or hole being machined to lubricate the cutting surface and to cool both the workpiece and the tool.

Figure 5:
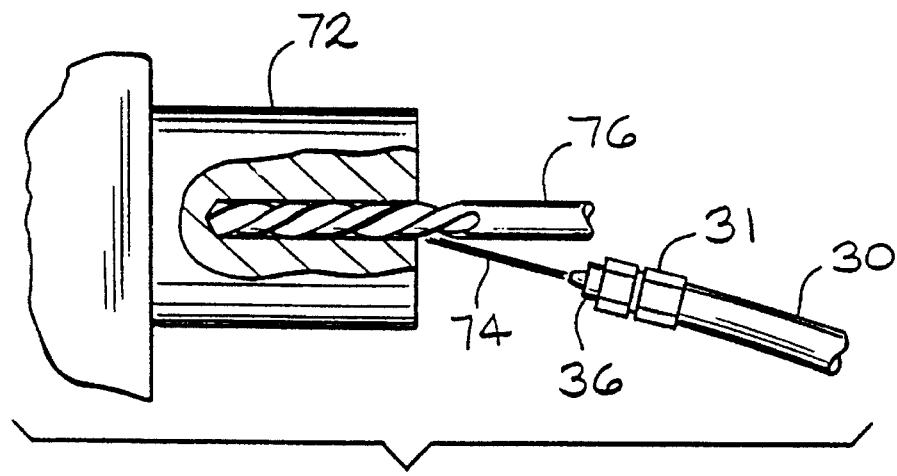
FIG. 5 is an enlarged elevational view illustrating a spray nozzle in relation to a drill and workpiece.

FIG. 5 illustrates a spray tube and nozzle in relation to a drilling operation in workpiece 72. The spray tube 30 is positioned such that the spray stream 74 is directed toward the flutes of drill 76. The size of the spray stream allows most, if not all of the coolant, to be directed into the hole being drilled where it can reach the tip of the drill and perform its function of cooling and lubricating at the cutting location.

The benefits of improved cooling can be manifested in a variety of ways. The tool life can be significantly increased, the cutting speed can be increased, the number of cutting tools used can be decreased, the surface finish can be improved and the machine downtime decreased.

With the small orifice in the outlet nozzles 26, it is necessary to ensure that no metal chips pass through the system that can block a nozzle orifice. The filter 20 is designed to filter out particles above 149 microns. Particles of smaller size can easily pass through a nozzle orifice of 0.020 inches and do not present a hazard to the internal gear pump. If necessary, a filter capable of filtering particles down to a size of 75 microns can be used. The improved filtration, as compared to current systems, also results in better lubrication due to the absence of large particles in the coolant flow.

Filter 20 is shown in greater detail in FIG. 2. Filter 20 includes an outer perforated casing 50 containing a cylindrical filter element 52 therein. Coolant flow into the filter is shown by arrows 51. Filter element 52 is of a metallic structure with the seam 54 welded to strengthen the element. In addition, annular reinforcing bands 56 are provided within the interior of the filter element to strengthen the filter element to prevent filter collapse due to the pump suction.

In the embodiment shown in FIG. 2, the filter outlet 56 is fitted with an adapter 58 to reduce the filter outlet diameter to that of the inlet hose being used. The filter 20 is coupled to the inlet hose using a quick connect/disconnect coupling assembly 60 such as a Kamlok coupling by the Dover Corporation in Cincinnati, Ohio. (Kamlok is a registered trademark of the Dover Corporation.) Coupling 60 includes coupling member 62 fastened to the adapter 58 and coupling member 64 connected to the inlet hose 18.

The quick connect/disconnect coupling assembly 60 is used to enable a clogged or dirty filter 20 to be quickly removed from the inlet hose and a clean filter placed thereon, enabling the machine to return to service relatively quickly. After removal of a dirty filter 20, the filter is cleaned and made available for the next filter change. By doing so, the machine down time required for cleaning a clogged filter is significantly reduced from as long as five to less than one minute. The need for filter cleaning is indicated by increased suction produced by the pump.

As shown in FIG. 1, the inlet hose 18 extends upwardly from the top of reservoir 12. Naturally, the filter 20 is submerged within the coolant 22. Hose 18 or at least a terminal portion of the hose is flexible to enable the operator to conveniently raise the filter 20 out of the reservoir 12 in order to accomplish a filter change. This eliminates any need for the machine operator to reach into the reservoir and thus reduces operator skin contact with the coolant. The inlet check valve 40 also operates to prevent drainage of the coolant from hose 18 during a filter change.

Check valve 40 in the inlet hose 18 has a closure element made of plastic so as to be light weight. This reduces the suction required from the pump to open the check valve. A metallic check valve element can be used if desired. The outlet check valve 42 is of a metallic construction to better to resist wear induced by the high pressure fluid flow through the check valve.

The motor 38 is preferably directly coupled to the pump 14 to eliminate the need for a belt drive and the subsequent maintenance required.

The spray tubes 30 are ⅜ inch in size rather than the ½ to 1 inch diameter lines typically used with prior art cooling systems. The spray tubes are made of copper or stainless steel. The nozzles 36 are brass or stainless steel. For both the tubes and nozzles, stainless steel is used for higher pressure applications where the copper and brass are susceptible to wear. The spray nozzles are formed with an outside thread to enable the nozzles to be mounted to the spray tubes by a compression fitting 31. However, when space is limited and close positioning of the nozzle is required, an inside thread on the nozzle enables the nozzle to be threaded directly onto the end of the spray tube 30 after an outside thread is cut into the tube. This enables the nozzles to be securely fitted On the spray tube without the use of a compression fitting and placed closer to the cutting location.

The benefits and advantages of the coolant system of the present invention can be seen by the following examples.

EXAMPLE I

A multiple spindle screw machine used to machine a gear blank was retrofitted with the cooling system of the present invention. Prior to retrofit, the following tools were used: four drills for the inside diameter; two reamers to produce the inside diameter finish requirement; and four cross slide form tools to form the outside. Coolant was supplied at a flow rate estimated at 30 gallons per minute and applied with a pump outlet pressure estimated at 30 psi. Cycle time was 22 seconds.

The cooling system 10 installed on the machine utilized a Double A 0-30 size Gerotor pump driven by a 7.5 Hp motor at 1800 rpm. A 1.5 inch diameter inlet hose was used with a 1 inch diameter outlet hose. Seven spray nozzles were used with orifice sizes ranging from 0.042 to 0.093 inches. The pump was positioned on top of the machine approximately six and one half feet above the level of coolant in the reservoir. The inlet side suction was 13.5 inches of Hg, while the outlet side pressure was 420 psi. The system developed a coolant flow rate of approximately 40 gallons per minute.

The cycle time was reduced from 22 seconds to 13.5 seconds. One machine was able to produce 2100 parts per shift whereas only 1400 parts per shift were produced with two machines before the coolant system was changed. Tool life was increased from approximately 8 hours to more than 26 hours. The micro finish was also improved. One reamer, one drill and one cross slide form tool were removed, reducing the number of tools from ten to seven. Energy use was reduced by 40%. The drastic increase in production is due to reduced cycle time and reduced machine down time for tool sharpening, filter cleaning and manual removal of chips from the workpiece.

EXAMPLE II

With another multiple spindle screw machine equipped with the same coolant system as described in Example I, the following improvements were noted. Cycle time was reduced from 42 seconds to 22 seconds. Drill life increased from 4 hours to 100 hours before grinding was necessary and the amount of material removed during grinding was reduced.

EXAMPLE III

The same coolant system as in Examples I and II was installed on another multiple spindle screw machine. The goal was to maximize production speed, reducing cycle time from 43.5 seconds to 27.0 seconds. Energy use was decreased by 15 percent as a result of decreased load on the machine motor from improved lubrication.

It can be seen by the above examples that the coolant system of the present invention provides a significant cost savings and increase in production in the machine tool industry. This is accomplished by directing the coolant to the point of heat generation by a high pressure spray and with small diameter spray nozzles. The result is a greater portion of the coolant being used to remove heat and to lubricate, reducing heat build up. The coolant system of this invention can be retro-fitted onto existing machinery or it can be incorporated into original equipment. While the primary application of the cooling system is believed to be in metal machining industry, the cooling system can be used in any application where material is being cut or removed.

It is to be understood that the invention is not limited to the exact construction or method illustrated and described above, but that various changes and modifications may be made without departing from the spirit and scope of the invention as defined in the following claims.

I claim:

1. A machine tool comprising:

means for holding a plurality of workpieces;

tool means for simultaneously performing a material removal operation on each of said plurality of workpieces;

a reservoir containing a quantity of a liquid coolant for cooling said plurality of workpieces and said tool means during said material removal operation;

delivery means for delivering said coolant from said reservoir to said plurality of workpieces and said tool means, said delivery means including a positive displacement pump having an inlet and an outlet and drive means for said pump to produce a coolant flow rate of at least 3.5 gallons per minute, an inlet conduit connecting said pump inlet to said reservoir to enable said pump to receive coolant through said pump inlet, check valve means disposed within said inlet conduit to prevent substantial drainage of coolant from said inlet conduit when said pump is not in operation, an outlet conduit from said pump outlet to said plurality of workpieces and said tool means, said outlet conduit terminating in at least one spray nozzle adjacent to each of said plurality of workpieces and tool means, said nozzles having restricted orifices compared to said outlet conduit immediately upstream from said nozzles to produce a back pressure in said outlet conduit of at least 300 psi with the entire coolant flow of at least 3.5 gallons per minute being discharged through said nozzles.

2. The machine tool of claim 1 wherein said restricted orifices are less than 0.100 inches in diameter.

3. The machine tool of claim 1 wherein said restricted orifices are between 0.020 and 0.100 inches in diameter.

4. The machine tool of claim 1 further comprising check valve means disposed within said outlet conduit to prevent substantial drainage of coolant from said outlet conduit when said pump is not in operation.

5. The machine tool of claim 1 further comprising a filter coupled to one end of said inlet conduit and submerged in coolant in said reservoir through which coolant must flow to enter said inlet conduit and wherein at least an end portion of said inlet conduit adjacent said filter is flexible to enable said filter to be removed from coolant in said reservoir while coupled to said inlet conduit.

6. The machine tool of claim 5 further comprising quick connect/disconnect means to couple and remove said filter to and from said inlet conduit by hand without the use of tools.

7. The machine tool of claim 1 further comprising:

a high pressure relief valve in communication with said outlet conduit operable to relieve pressure within said outlet conduit in the event coolant pressure within said outlet conduit exceeds a predetermined maximum level; and a return line providing communication between said relief valve and said reservoir for returning coolant to said reservoir from said relief valve.

8. A machine tool comprising:

means for holding a plurality of workpieces;

tool means for simultaneously performing a material removal operation on each of said plurality of workpieces;

a reservoir containing a quantity of a liquid coolant for cooling said plurality of workpieces and said tool means during said material removal operation;

delivery means for delivering said coolant from said reservoir to said plurality of workpieces and said tool means, said delivery means including a positive displacement pump having an inlet and an outlet and drive means for said pump to produce a coolant flow rate of at least 3.5 gallons per minute, an inlet conduit connecting said pump inlet to said reservoir to enable said pump to receive coolant through said pump inlet, check valve means disposed within said inlet conduit to prevent substantial drainage of coolant from said inlet conduit when said pump is not in operation, an outlet conduit from said pump outlet to said plurality of workpieces and said tool means, said outlet conduit terminating in at least one spray nozzle adjacent to each of said plurality of workpieces and tool means, said at least one nozzle having an orifice of predetermined size to produce a back pressure in said outlet conduit of at least 300 psi with the entire coolant flow of at least 3.5 gallons per minute being discharged through said at least one nozzle.

* * * * *